(12) United States Patent
Blum et al.

(10) Patent No.: US 10,624,723 B2
(45) Date of Patent: Apr. 21, 2020

(54) KIT FOR PREPARING A DENTAL PROSTHESIS

(71) Applicant: ANTHOGYR, Sallanches (FR)

(72) Inventors: Benoît Blum, Sallanches (FR); Alexis Dupasquier, Saint Gervais les Bains (FR); Hervé Richard, Notre Dame de Bellecombe (FR)

(73) Assignee: ANTHOGYR, Sallanches (FR)

( * ) Notice: Subject to any disclaimer, the term of this patent is extended or adjusted under 35 U.S.C. 154(b) by 212 days.

(21) Appl. No.: 15/725,368

(22) Filed: Oct. 5, 2017

(65) Prior Publication Data
US 2018/0104033 A1 Apr. 19, 2018

(30) Foreign Application Priority Data

Oct. 19, 2016 (FR) ...................................... 16 60123

(51) Int. Cl.
| | | |
|---|---|---|
| *A61C 11/00* | (2006.01) | |
| *A61C 13/34* | (2006.01) | |
| *A61C 13/00* | (2006.01) | |
| *A61C 8/00* | (2006.01) | |
| *A61C 9/00* | (2006.01) | |

(52) U.S. Cl.
CPC ............ *A61C 13/34* (2013.01); *A61C 8/0027* (2013.01); *A61C 8/0068* (2013.01); *A61C 9/0046* (2013.01); *A61C 13/0013* (2013.01)

(58) Field of Classification Search
CPC ..... A61C 13/34; A61C 8/0027; A61C 8/0068; A61C 9/0046
See application file for complete search history.

(56) References Cited

U.S. PATENT DOCUMENTS

| | | | | |
|---|---|---|---|---|
| 6,273,721 B1* | 8/2001 | Valen | ................... | A61C 8/0022 433/174 |
| 2011/0029093 A1 | 2/2011 | Bojarski | | |
| 2011/0318706 A1* | 12/2011 | Brajnovic | ............ | A61C 8/0022 433/174 |
| 2013/0216980 A1 | 8/2013 | Boronkay | | |

(Continued)

FOREIGN PATENT DOCUMENTS

| | | |
|---|---|---|
| WO | 2014139498 A1 | 9/2014 |
| WO | 2014161552 A2 | 10/2014 |

*Primary Examiner* — Nicholas D Lucchesi
(74) *Attorney, Agent, or Firm* — William H. Eilberg

(57) ABSTRACT

A kit (1) for preparing a dental prosthesis, having a master model (2) manufactured by means of an additive technology using an arrangement of material in successive layers (3), such as 3D printing, and having a fixing screw (4) with an outer thread (4a) intended to removably fix a dental prosthesis element on the master model (2). The master model (2) has at least one reference surface intended to receive the dental prosthesis element bearing thereon, said reference surface being produced during the manufacture of the master model (2) by additive technology. The master model (2) has at least one threaded, cavity (6), of which the inner thread (6a), intended to receive said fixing screw (4) by screwing, is produced during the manufacture of the master model (2) by additive technology. The outer thread (4a) of the fixing screw (A) has a pitch (P) greater than or equal to 10 times the thickness (E) of the layers (3), and it has a thread height (H) greater than or equal to 5 times the thickness (E) of the layers (3).

23 Claims, 10 Drawing Sheets

(56) References Cited

U.S. PATENT DOCUMENTS

| | | | |
|---|---|---|---|
| 2015/0173864 A1* | 6/2015 | Pomeranitz | A61C 8/005 |
| | | | 433/174 |
| 2015/0374466 A1 | 12/2015 | Jahn | |
| 2016/0135931 A1 | 5/2016 | Morales | |
| 2018/0344434 A1* | 12/2018 | Poovey | A61C 8/0069 |
| 2019/0167396 A1* | 6/2019 | Sassi | A61C 13/34 |

* cited by examiner

KIT FOR PREPARING A DENTAL PROSTHESIS

TECHNICAL FIELD OF THE INVENTION

The present invention relates to the field of dental prosthetic restoration and more particularly relates to the manufacture of a kit comprising a master model manufactured, by means of an additive technology such 3D printing (also called "three-dimensional printing").

The master model is a representation of at least a part of the patient's oral cavity that is to be restored by the prosthesis to be manufactured. The prosthetist uses it to prepare a prosthesis that is exactly dimensioned to conform to the patient's dentition.

The master models are manufactured on the basis of plotting the intraoral geometry of the patient. Traditionally, the master models have been manufactured in plaster from impressions of the patient's dentition that are obtained using a dental paste arranged in generally U-shaped impression holders. When dental restoration involves the use of one or more dental implants, the master model has one or more implant analogs positioned and oriented in such a way as to reproduce with precision the position of the one or more implants in the mouth of the patient. The blanks of dental prosthesis elements are each fixed to the master model by a fixing screw with an outer thread that is to be screwed into an internally threaded bore of the implant analog.

Nowadays, the process of three-dimensional intraoral scanning makes it possible to plot the intraoral geometry of the patient without the need to take impressions by means of impression holders, the precision of which depended to a large extent on the dexterity of the dentist taking the impression. Three-dimensional intraoral scanning provides a three-dimensional computerized model of the dentition of the patient, and the prosthetist will subsequently use this model to configure the prosthesis.

The three-dimensional computerized model of the dentition of the patient is then used to manufacture the master model by a manufacturing process involving addition of material (additive technology such as 3D printing). A 3D printer "prints" the master model by stacking up a succession of fine layers of material.

In this context, cavities intended to receive the attached implant analogs in a precise and indexed manner are formed, as is described in the documents US 2011/029093 A1, US 2015/0374466 A1, US 2016/0135931 A1, WO 2014/139498 and WO 2014/161552 A2.

A problem arises in achieving sufficient precision in the printing of the cavities intended to receive the attached implant analogs, which have specific (non-standardized) outer shapes particular to each brand of implant used by dental surgeons. It is also necessary that the prosthetist has a sufficient stock of implant analogs of different brands and then correctly engages the implant analogs in their respective cavities. Moreover, the addition of implant analogs greatly increases the cost of manufacture of the master model.

Finally, adjacent implants may have to be placed in the mouth of the patient in immediate proximity to each other and at angles that make them impossible to reproduce by means of implant analogs in a master model.

The document US 2013/0216980 A1 describes a master model manufactured by additive technology such as 3D printing. Here too, a cavity is formed in order to receive an implant analog in a precise and indexed manner. For greater reliability, the implant analog can be fixed to the master model by means of a fixing screw that engages in a hole formed in the master model (FIG. 32). However, the method by which said hole intended, to receive said fixing screw is produced in the master model is entirely ignored. In particular, it is quite possible for it to be produced by a manufacturing process involving removal of material (in particular drilling) after the master model has been manufactured by additive technology. Moreover, it is not known whether said hole is provided with an inner thread or whether it is a smooth cylindrical hole in which the fixing screw will be inserted, with force and/or will create an inner thread as it is screwed in.

SUMMARY OF THE INVENTION

A problem, addressed by the present invention is to manufacture a master model by means of an additive technology using an arrangement or material in successive layers, for example 3D printing, at a reduced cost, while at the same time reducing the risks of imprecision.

Another problem addressed by the invention is to ensure a reliable hold of the prosthesis on the master model during the shaping of the prosthesis by the prosthetist.

To achieve these objects, and others, the invention makes available a kit for preparing a dental prosthesis, said kit having:
a master model manufactured by means of an additive technology using an arrangement of material in successive layers, such as 3D printing,
a fixing screw with an outer thread intended to removably fix a dental prosthesis element on the master model;
according to the invention:
the master model has at least one reference surface intended to receive the dental prosthesis element bearing thereon, said reference surface corresponding to a reference surface of a dental implant in the mouth of the patient and being produced during the manufacture of the master model by additive technology,
the master model has at least one threaded cavity, of which the inner thread, intended to receive said fixing screw by screwing, is produced, during the manufacture of the master model by additive technology,
the outer thread of the fixing screw has:
 a pitch greater than or equal to 10 times the thickness of the layers,
 a thread height greater than or equal to 5 times the thickness of the layers.

The master model is manufactured by plotting the oral geometry of a patient having at least one dental implant that has a reference surface. The reference surface of the master model corresponds to the reference surface of said dental implant and will therefore be able to receive the dental prosthesis element bearing directly thereon.

The master model, has no implant analog, since the thread intended to receive the fixing screw is directly printed during the manufacture of the master model. The reference surfaces for receiving (by direct contact) the dental prosthesis element (such as a prosthesis, for example a transfixed multiple prosthesis frame, or such as a dental abutment) are likewise produced directly by 3D printing. The cost of the master model is thus greatly reduced, and there are no longer any risks of conflict between adjacent implant analogs.

During the manufacture, adjustment or control of a dental prosthesis element by the prosthetist, the latter:
attaches said, dental prosthesis element such that it bears directly on the reference surface of the master model, fixes said dental prosthesis element to the master model by screwing the fixing screw into the dental prosthesis element and into the threaded cavity of the master model.

The pitch and thread height of the thread of the fixing screw give the thread sufficient dimensions, relative to the thickness of the layers, to ensure that the inner thread of the threaded cavity receives the fixing screw in a reliable and precise manner and affords a satisfactory hold.

Advantageously, the thread profile of the (temporary) fixing screw in the master model can be different from the thread profile of the threaded cavity of the implant in the mouth of the patient, such that this fixing screw cannot then be engaged and/or retained by screwing in the threaded cavity of the implant in the mouth of the patient. This prevents a situation where the screw for the (temporary) fixing of the prosthesis (or dental prosthesis element) to the master model is re-used by the dental surgeon as a definitive fixing screw for subsequently fixing the prosthesis to the implant in the mouth of the patient. The risk of failure of the fixation of the prosthesis in the mouth is thereby reduced. The screw for fixing the prosthesis to the master model can then be made of a non-biocompatible material, in order to reduce costs, and is used exclusively to fix the dental prosthesis element to the master model, whereas a different screw will be used to fix the dental prosthesis element to the dental implant in the mouth of the patient.

Preferably, the outer thread of the fixing screw can have a profile that is not a metric profile. A metric profile would necessitate using layers of excessively reduced thickness in order to comply with the parameters set by the present invention. This would greatly increase the 3D printing time and, consequently, the cost of obtaining the master model. In addition, the threaded cavity of the implant in the mouth of the patient is generally provided with a thread that has a metric profile. Thus, if the outer thread of the fixing screw does not have a metric profile, this prevents it from being re-used, in most implants in the mouth, for the definitive fixation of the prosthesis.

Preferably, the outer thread of the fixing screw can have a trapezoidal profile. The threads thus do not have a cutting edge at their summit, which limits the risk of damage to the inner thread, of the threaded cavity in which the fixing screw is inserted several times during the manufacture of the prosthesis.

Advantageously, the fixing screw and the threaded cavity can be configured such that, when a dental prosthesis element is fixed on the master model, the fixing screw is engaged in the inner thread along at least four pitches.

Engagement along four pitches has proven sufficient to limit the risk of damage to the inner thread of the threaded cavity during the tightening of the fixing screw. This avoids the constituent material of the inner thread of the threaded cavity (generally a plastic) being deformed plastically or even being accidentally torn away.

Advantageously, provision can be made that:
the kit is intended to be combined with a dental prosthesis element in the form of a transfixed multiple prosthesis frame,
the threaded cavity is formed in an excrescence with a distal segment intended to engage at least partially in a corresponding hollow seat formed in said transfixed multiple prosthesis frame.

A transfixed multiple prosthesis frame is generally used for partial or complete restoration of a dental arch. It is generally worn in the mouth of the patient via several implants that extend in non-parallel (oblique) directions with respect to each other. The excrescences with the distal segment intended to engage at least partially in the corresponding hollow seats formed in said transfixed multiple prosthesis frame permit precise positioning of the multiple prosthesis frame on the master model.

Alternatively, provision can be made that:
the kit is intended to be combined with a dental prosthesis element in the form of a transfixed multiple prosthesis frame,
the threaded cavity is formed in the continuation of a hollow seat, said hollow seat being intended to receive at least part of the distal segment of a corresponding excrescence carried by said transfixed multiple prosthesis frame.

The hollow seats intended to receive at least part of the distal segment of corresponding excrescences carried by said transfixed multiple prosthesis frame permit precise positioning of the multiple prosthesis frame on the master model.

Preferably, provision can be made that:
the distal segment of the excrescence is provided with a lateral clearance on its outer surface, and/or
the hollow seat is provided with a lateral clearance on its inner surface.

Each excrescence with a distal segment provided on its outer surface with a lateral clearance (for example by means of a frustoconical outer shape) cooperates with the corresponding hollow seat (possibly provided on its inner surface with a lateral clearance, for example by means of a frustoconical inner shape) of the transfixed multiple prosthesis frame to permit progressive and precise centering of the prosthesis frame on each of the excrescences. The outer lateral clearance of the excrescences facilitates the engagement of the transfixed multiple prosthesis frame on the excrescences, particularly when the excrescences develop along respective axial directions that are oblique with respect to each other.

Advantageously, provision can be made that:
the kit additionally comprises a false gum intended to be attached to the master model,
one of master model and false gum has an excrescence provided with a segment intended to engage at least partially in a corresponding hollow seat formed in the other of master model and false gum.

The false gum allows the prosthetist to ensure the esthetic nature of the prosthetic restoration in preparation, by verifying in particular that the junction between the prosthesis and the implant will be well hidden by the gum.

Preferably, provision is made that:
the segment of the excrescence is provided with, a lateral clearance on its outer surface, and/or
the hollow seat is provided with a lateral clearance on its inner surface.

Here too, each segment of an excrescence provided on its outer surface with a lateral clearance (for example by means of a frustoconical outer shape) cooperates with the corresponding hollow seat (possibly provided on its inner surface with a lateral clearance, for example by means of a frustoconical inner shape) of the false gum in order to permit progressive and precise centering of the false gum on each of the excrescences. The outer lateral clearance of the excrescences facilitates the engagement of the false gum on the excrescences, particularly when the excrescences develop along respective axial directions that are oblique with respect to each other.

Preferably, provision can be made that:
the kit is intended to be combined, with a dental prosthesis element in the form, of an abutment of a single dental prosthesis, a hollow connection socket intended to receive said abutment of a single dental prosthesis is formed at the mouth of the threaded cavity.

The master model thus has a connector system designed to receive the abutment of the single dental prosthesis with precision, this connector system being directly printed during she manufacture of the master model. Said hollow connection socket can have a non-circular cross section, the abutment thus being able to be indexed in rotation with respect to the master model.

Alternatively, provision can be made that:

the kit is intended to be combined with a dental prosthesis element in the form of an abutment of a single dental prosthesis, the threaded cavity is formed in an excrescence with a distal segment intended to engage at least partially in a corresponding hollow seat formed in said abutment of a single dental prosthesis.

Here too, for progressive and precise centering of the abutment of the single dental prosthesis on the excrescence, provision can preferably be made that:

the distal segment of the excrescence is provided with a lateral clearance on its outer surface, and/or the hollow seat is provided with a lateral clearance on its inner surface.

Preferably, provision can be made that:

the kit additionally comprises a false gum intended to be attached to the master model, one of master model and false gum has a protuberance intended to engage at least partially in a corresponding hollow seat formed in the other of master model and false gum.

The false gum allows the prosthetist to ensure the esthetic nature of the prosthetic restoration in preparation, by verifying in particular that the junction between the prosthesis (or the abutment of the prosthesis) and the implant will be well hidden by the gum.

Advantageously, provision can be made that:

the protuberance is provided with a lateral clearance on its outer surface, and/or the hollow seat is provided with a lateral clearance on its inner surface.

Here too, each protuberance provided on its outer surface with a lateral clearance (for example by means of a frustoconical outer shape) cooperates with the corresponding hollow seat (possibly provided on its inner surface with a lateral clearance, for example by means of a frustoconical inner shape) of the false gum in order to permit progressive and precise centering of the false gum on the protuberance.

According to another aspect of the invention, a method is made available for manufacturing a master model for preparation of a dental prosthesis on the basis of a computer file of three-dimensional computerized modeling of the patient dentition that is to be restored. According to the invention, said, method comprises a step in which at least one reference surface intended to be produced during the manufacture of the master model by additive technology, and corresponding to a reference surface of a dental implant in the mouth of the patient, is included in the three-dimensional computerized modeling.

According to a further aspect of the invention, a master model is made available which is manufactured by an additive technology, such as 3D printing, said master model having at least one reference surface intended to receive a dental prosthesis element bearing thereon, said reference surface being produced during the manufacture of the master model by additive technology and corresponding to a reference surface of a dental implant arranged in the mouth of the patient.

BRIEF DESCRIPTION OF THE DRAWINGS

Other subjects, features and advantages of the present invention will become clear from the following description of particular embodiments, with reference being made to the attached figures in which.

DESCRIPTION OF THE PREFERRED EMBODIMENTS

Two particular embodiments of kits 1 according to the invention are illustrated in FIGS. 1 to 18. A first embodiment is illustrated in FIGS. 1 to 9, while a second embodiment is illustrated in FIGS. 10 to 17.

In all these embodiments, the kit 1 for preparing a dental prosthesis has a master model 2 manufactured by means of an additive technology using an arrangement of material in successive layers 3 (see FIG. 9), such as 3D printing. The master model 2 is manufactured on the basis of an intraoral scan.

Figure 7:
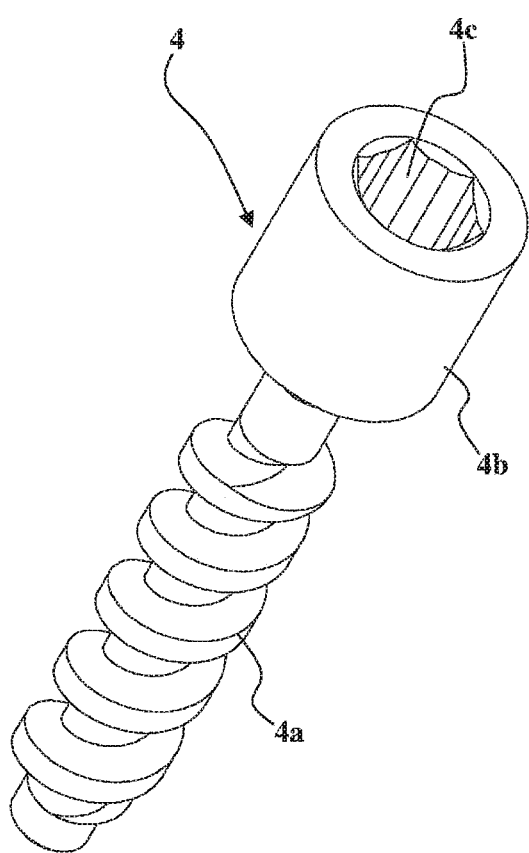
FIG. 7 is a perspective view of the fixing screw of the kit from FIG. 1.
Figure 8:
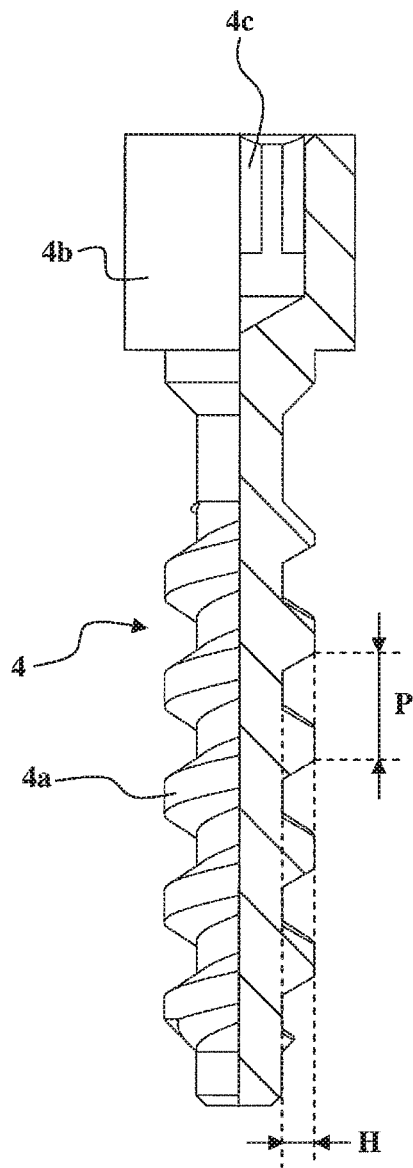
FIG. 8 is a side view of the screw from FIG. 7 in partial cross section.

The kit 1 additionally has at least one fixing screw 4 with an outer thread 4a intended to removably fix a dental prosthesis element 5 to the master model 2. Two fixing screws 4 particular to each of the embodiments are illustrated in FIGS. 7 and 8 on the one hand and in FIGS. 16 and 17 on the other hand. These fixing screws 4 are identical as regards their outer thread 4a and basically differ only in terms of the shape of their head 4b, in which a hollow hexagonal socket 4c is formed for driving in rotation.

The master model 2 has at least one reference surface S intended to receive the dental prosthesis element 5 bearing thereon, said reference surface S being produced during the manufacture of the master model 2 by additive technology.

The master model 2 has at least one threaded cavity 6, of which she inner thread 6a, intended to receive said fixing screw 4 by screwing, is produced during the manufacture of the master model 2 by additive technology (see FIGS. 1 to 6 and FIGS. 10 to 15).

Figure 9:
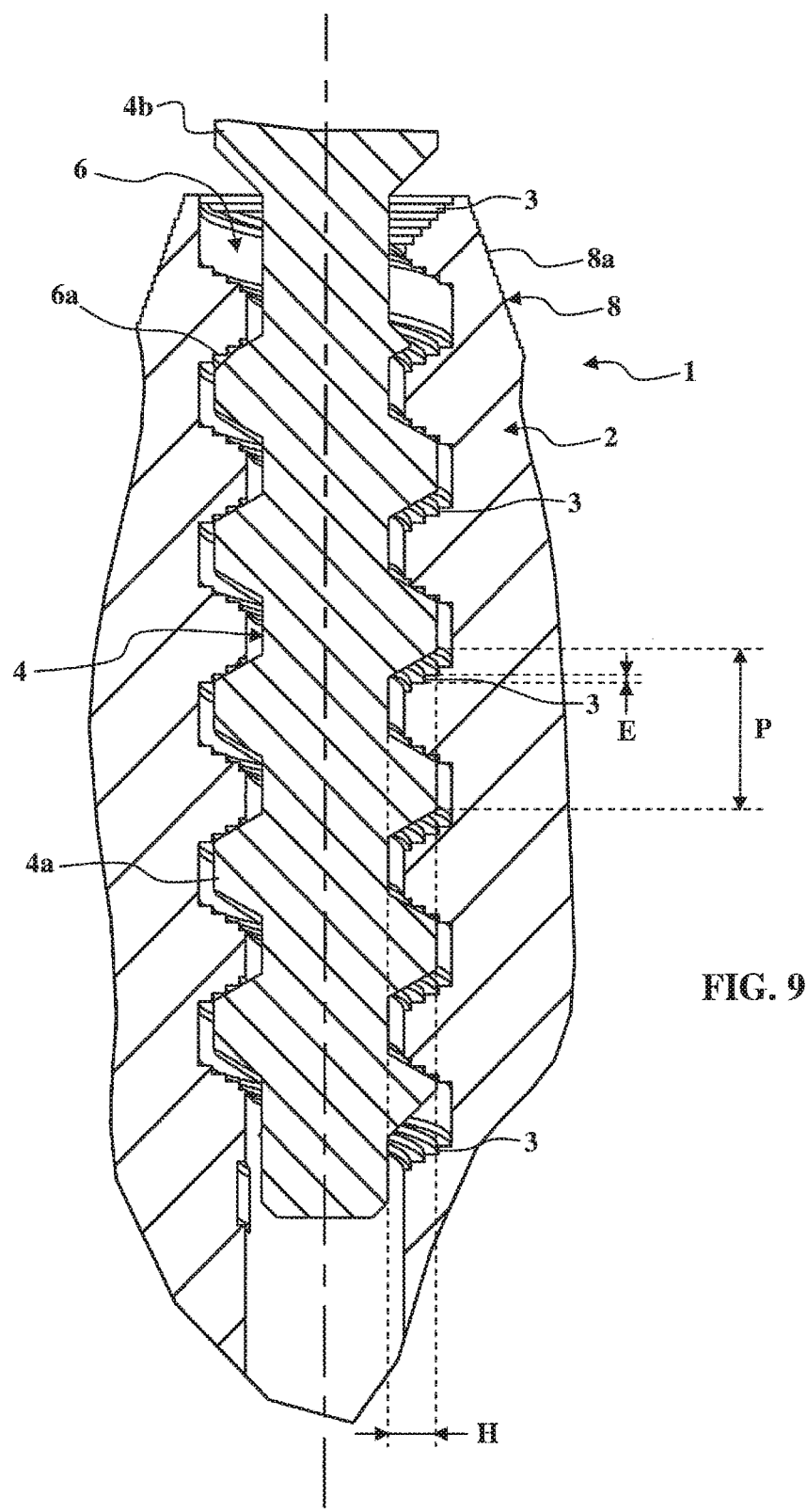
FIG. 9 is a side view of the screw from FIG. 7, when engaged in the master model.
Figure 10:
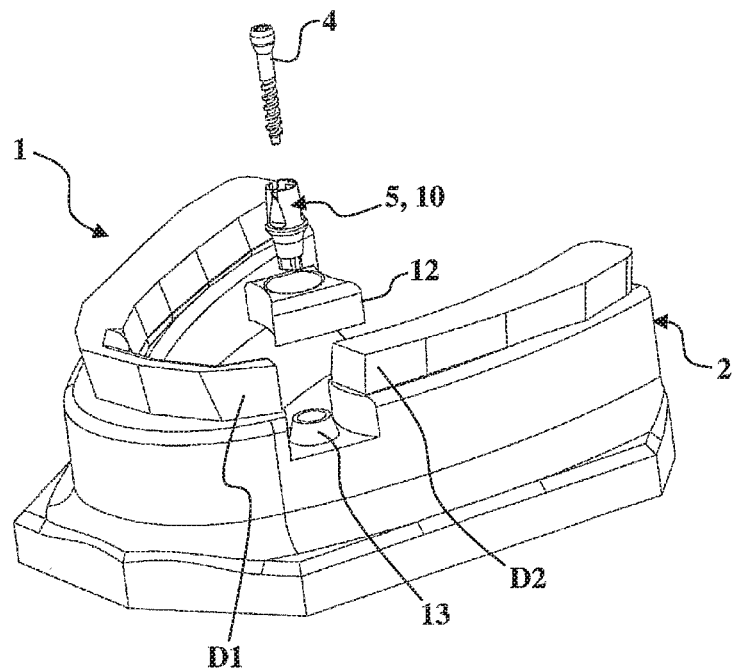
FIG. 10 is an exploded perspective view of a kit according to a second embodiment of the present invention, having a master model in combination with a dental prosthesis element, in the form of an abutment of a single prosthesis, and with a false gum.
Figure 11:
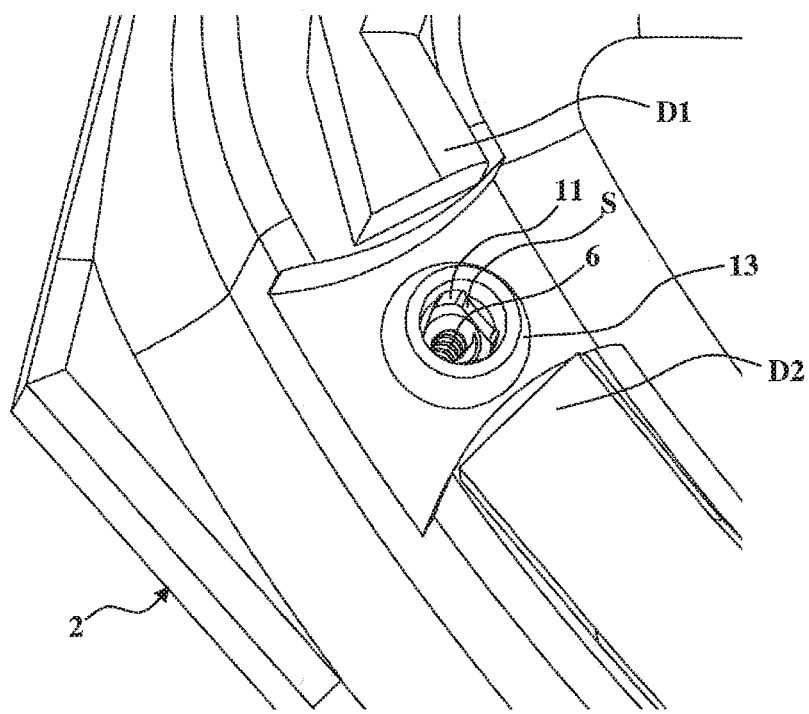
FIG. 11 is a perspective view of a detail of the master model from FIG. 10.
Figure 12:
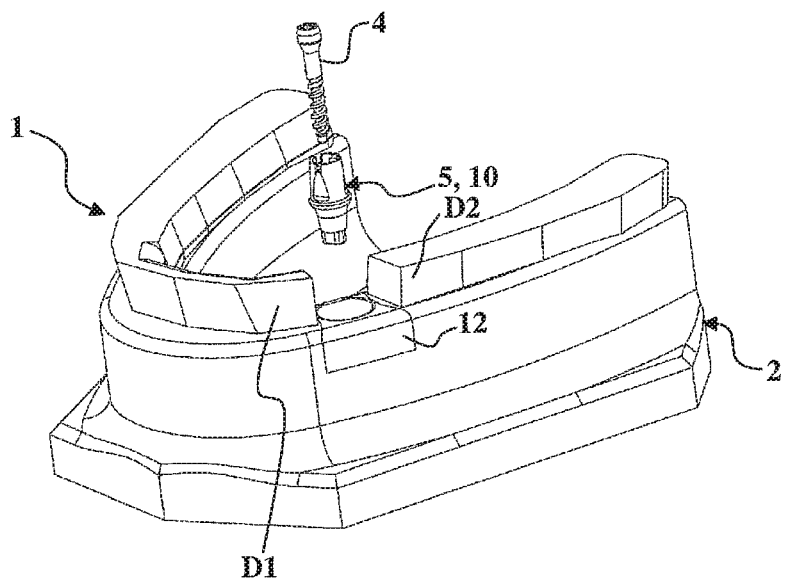
FIG. 12 is an exploded perspective view of the kit from FIG. 10, with the false gum positioned on the master model.
Figure 13:
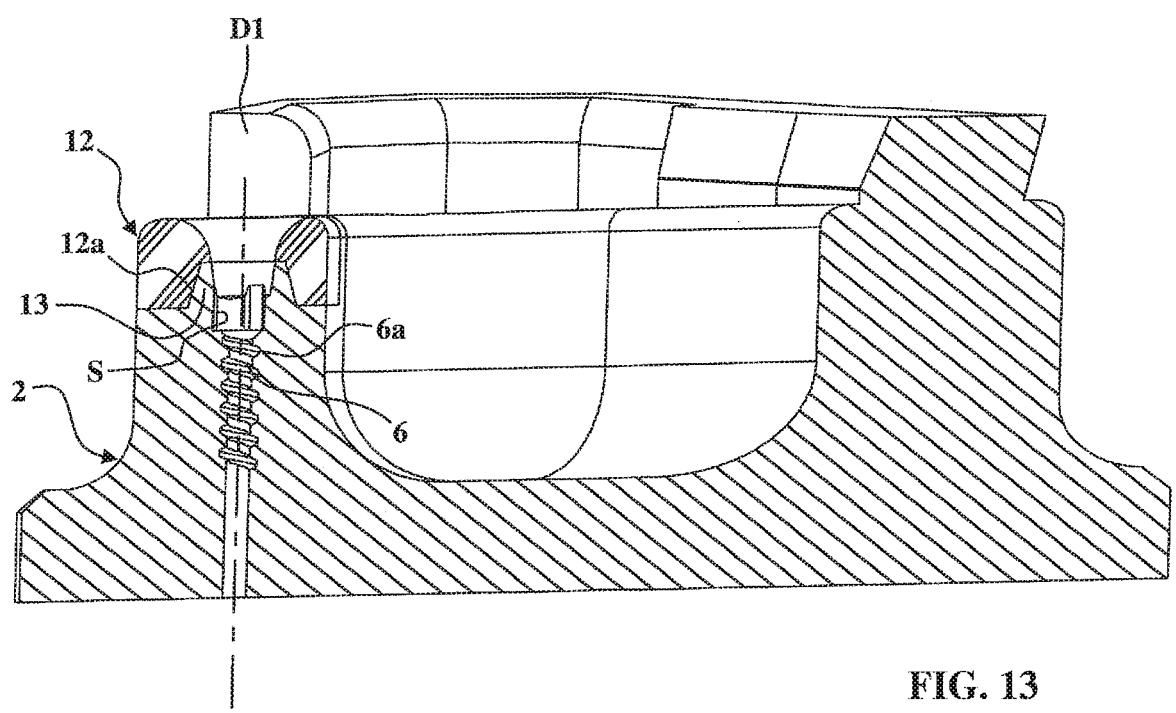
FIG. 13 is a cross-sectional view of the master model from FIG. 12.

As is shown more explicitly in FIG. 9, the outer thread 4a of the fixing screw 4 has:
- a pitch P greater than or equal to 10 times the thickness of the layers 3,
- a thread height K greater than or equal to 5 times the thickness E of the layers 3.

Still, in FIG. 9, it will be noted that the outer thread 4a of the fixing screw 4 does not have a metric profile. The outer thread 4a of the fixing screw 4 has a trapezoidal profile, such that the fixing screw 4 cannot be received in the dental implants, which generally have an inner thread with a metric profile. The fixing screw 4 is manufactured from a light metal material, which does not have to be biocompatible since it cannot be received by screwing in a dental implant in the mouth of the patient.

The fixing screw 4 and the threaded cavity 6 are configured such that, when a dental prosthesis element 5 is fixed on the master model 2, the fixing screw 4 is engaged in the inner thread 6a along at least four pitches, as is illustrated in FIG. 9.

In the first embodiment, illustrated in FIGS. 1 to 9, the kit 1 is combined with a dental prosthesis element 5 in the form of a transfixed multiple prosthesis frame 7. This transfixed multiple prosthesis frame 7 is intended to be fixed to a plurality of implants in the mouth of the patient (four in this case). Thus, several (four) threaded cavities 6 are provided that are representative of the implants when positioned in the mouth of the patient.

Figure 6:
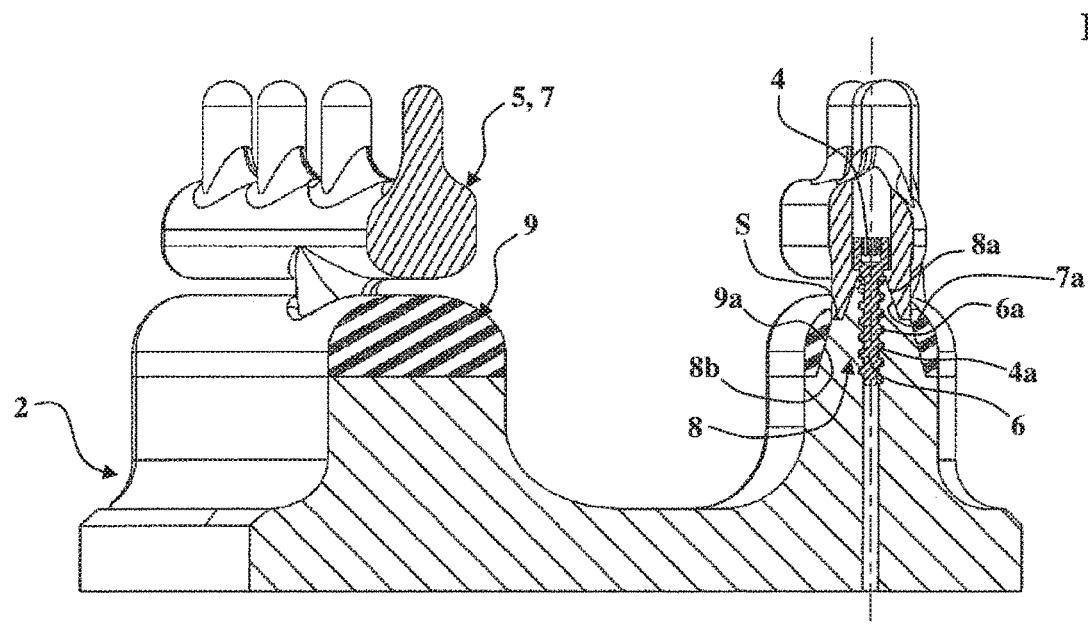
FIG. 6 is a cross-sectional view of the master model from FIG. 5.

Each threaded cavity 6 is formed in an excrescence 3 with a distal segment 8a having a frustoconical outer shape, said distal segment 8a being intended to engage at least partially in a corresponding frustoconical seat 7a formed in said transfixed multiple prosthesis frame 7, as can be seen mere particularly from FIG. 6.

As will be seen better in FIGS. 1 to 4, the excrescences 8 situated in the rear part of the master model 2 develop along respective axial directions that are oblique in relation to the respective axial directions along which the excrescences 8 at the front part of the master model 2 develop. This oblique arrangement results from the orientations of the threaded cavities 6, which are themselves the image of the orientations of the implants in the mouth of the patient.

The Kit 1 additionally comprises a false gum 9 intended to be attached to the master model 2. Each excrescence 8 has a proximal segment 8b with a frustoconical outer shape intended to engage at least partially in a corresponding frustoconical seat 9a formed in said false gum 9, as will be seen more particularly from FIGS. 4 and 6.

Between the distal segment 8a and the proximal segment fib of the excrescence 8, the master model 2 comprises a reference surface S substantially in the shape of a ring. This reference surface 8 corresponds exactly (in size, position and orientation) to the reference surface which is carried by the implant in the mouth and against which the transfixed multiple prosthesis frame 7 is intended to bear. Thus, when the transfixed multiple prosthesis frame 7 rests simultaneously on all of the reference surfaces S of the different excrescences 8, it is positioned and oriented as it will be in the mouth of the patient. The prosthetist is thus able to envision the prosthesis on the transfixed, multiple prosthesis frame 7, taking into account the teeth situated in proximity (which in this case are the teeth of the antagonist dental arch) for the contact zones and occlusion points.

Conversely, it is possible to provide an excrescence 8 on the transfixed, multiple prosthesis frame 7, which excrescence B is intended to be at least partially received in a hollow seat formed in the master model (at the mouth of the threaded cavity 6).

In the second embodiment, illustrated in FIGS. 10 to 17, the kit 1 is combined with a dental prosthesis element 5 in the form of an abutment 10 of a single dental prosthesis.

In order to receive and hold the abutment 10 on the master model 2 precisely in the same position that it will occupy in the mouth of the patient, a hollow connection socket 11 is formed at the mouth of the threaded cavity 6.

The hollow connection socket 11 has a reference surface S which corresponds exactly (in size, position and orientation) to the reference surface of the hollow socket of the implant in the mouth, in which the abutment 10 is intended to be received. Thus, when the abutment 10 is engaged in the hollow connection socket 11, it is positioned, and oriented as it will be in the mouth of the patient. The prosthetist is thus able to envision the prosthesis by fitting it on the abutment 10, taking into account the teeth situated in proximity (which in this case are the non-prosthetic adjacent teeth D1 and D2, and the teeth of the antagonist dental arch) for the contact zones and occlusion points.

The hollow connection socket 11 has a non-circular cross section in order to index the abutment 10 in rotation. Here, the cross section of the hollow connection socket 11 has a triangular shape, which complements the lower end of the abutment 10.

Conversely, it is possible to provide a threaded cavity 6 formed in an excrescence with a distal segment intended to engage at least partially in a corresponding hollow seat formed in said abutment 10 of the single dental prosthesis.

The kit 1 additionally comprises a false gum 12 intended to be attached to the master model 2. It will be seen more specifically from FIGS. 10, 11 and 13 that a frustoconical protuberance 13 is provided at the mouth of the hollow connection socket 11 and is intended to engage at least partially in a corresponding frustoconical seat 12a formed in said false gum 12.

Here too, the arrangement of male/female components carried by the false gum 12 and the master model 2 can be switched the other way round.

In the manufacture of a kit 1 according to the invention, the dental surgeon first of all carries out an intraoral scan of the patient's dentition that is to be restored.

This intraoral scan permits three-dimensional computerized modeling of the patient's dentition that is to be restored.

The computer file obtained from the intraoral scan is then further processed by computer in order to include reference surfaces corresponding to the one or more reference surfaces carried by the implant (or by the implants) arranged in the mouth of the patient.

This is followed by computer-aided manufacture of the master model 2 by means of additive technology using an arrangement of material in successive layers, sue h as 3D printing.

During this manufacture, a 3D printer prints the master model 2 by stacking a succession of fine layers of material 3 of thickness E.

In particular, the one or more threaded cavities 6 with their inner thread 6*a* are produced during the manufacture of the master model 2 by additive technology. The thickness E of the layers 3 is chosen to permit printing in a relatively short manufacturing time, while ensuring a reliable hold of the prosthesis on the master model 2 during the shaping of the prosthesis by the prosthetist. The parameters (pitch P and height H) of the outer thread 4*a* of the fixing screw 4 are provided accordingly, i.e.:

the pitch P is greater than or equal to 10 times the thickness E of the layers 3, the thread height H is greater than or equal to 5 times the thickness E of the layers 3.

The one or more reference surfaces S of the one or more hollow sockets 11, or if appropriate of the one or more excrescences 8 or protuberances 13, are also produced by 3D printing.

Once the master model 2 has been obtained, the prosthetist can engage the false gum 9 (FIGS. 3 and 4) or 12 (FIGS. 12 and 13) on the excrescences 8 or protuberances 13. The false gums 9 or 12 are engaged, with their one or more frustoconical seats 9*a* or 12*a* on the proximal segments 8*b* or the one or more protuberances 13 of the master model 2.

Figure 1:
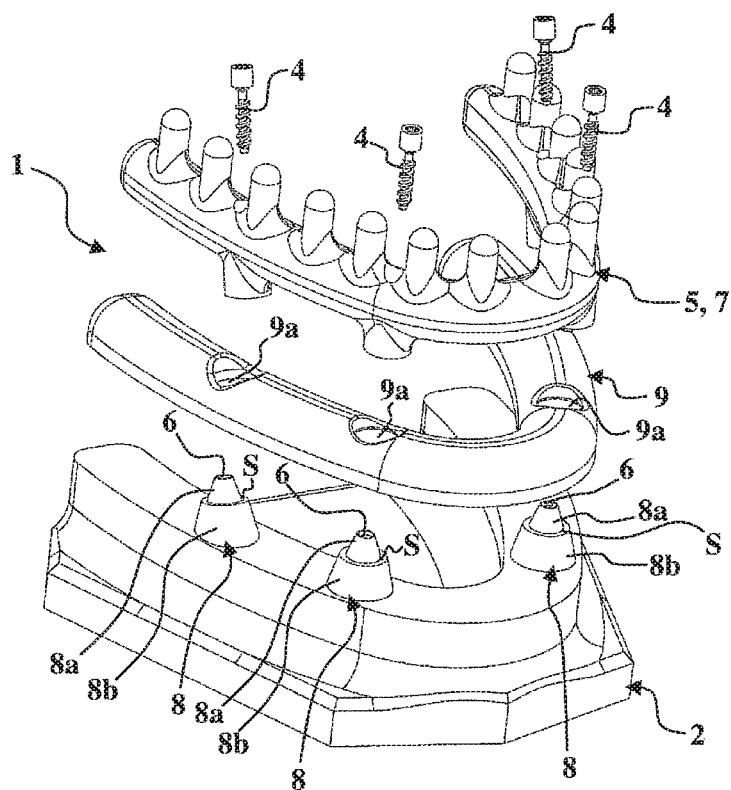
FIG. 1 is an exploded perspective view of a kit according to a first embodiment of the present invention, having a master model in combination with a dental prosthesis element, in the form of a transfixed multiple prosthesis frame, and with a false gum.
Figure 2:
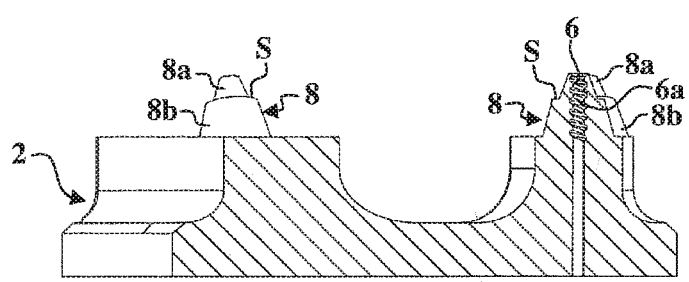
FIG. 2 is a cross-sectional view of the master model from FIG. 1.
Figure 3:
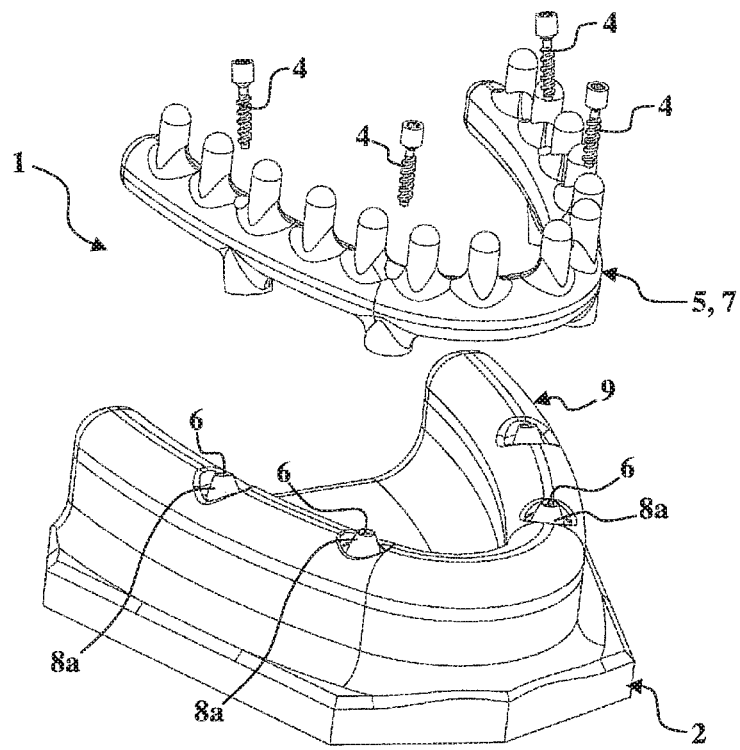
FIG. 3 is an exploded perspective view of the kit from FIG. 1, with the false gum positioned on the master model.
Figure 4:
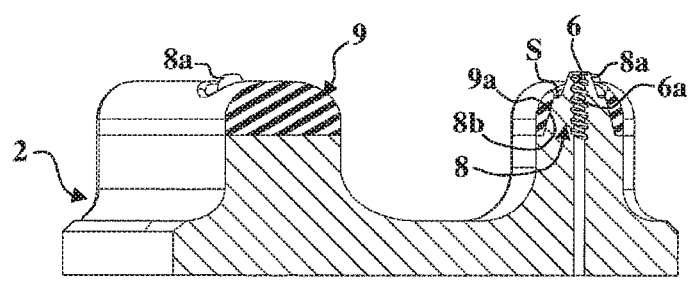
FIG. 4 is a cross-sectional view of the master model from FIG. 3.
Figure 5:
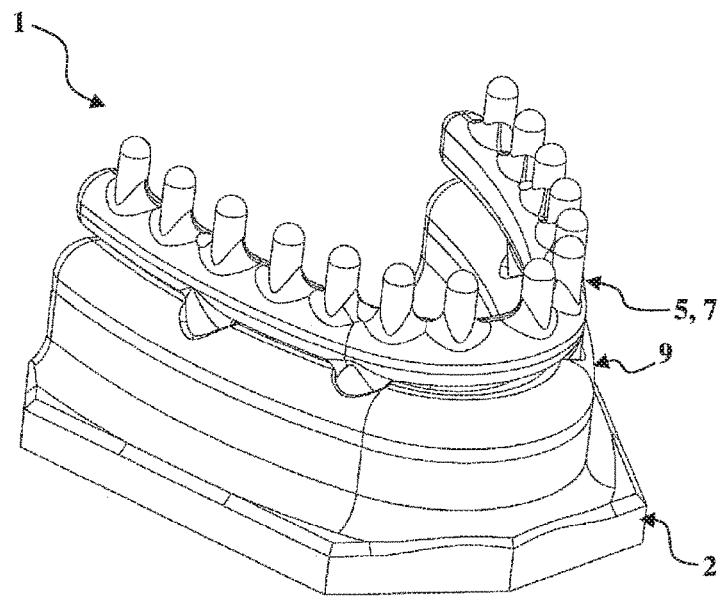
FIG. 5 is a perspective view of the kit from FIG. 1 when assembled.

In the case of the first embodiment, the prosthetist then places the transfixed multiple prosthesis frame 7 on the reference surfaces S, toward which the transfixed multiple prosthesis frame 7 is progressively guided by means of the frustoconical distal segments 8*a*. The prosthesis then inserts the fixing screws 4 into the threaded cavities 6 and screws them in order to fix the transfixed multiple prosthesis frame 7 on the master model 2 (FIGS. 5 and 6).

Figure 14:
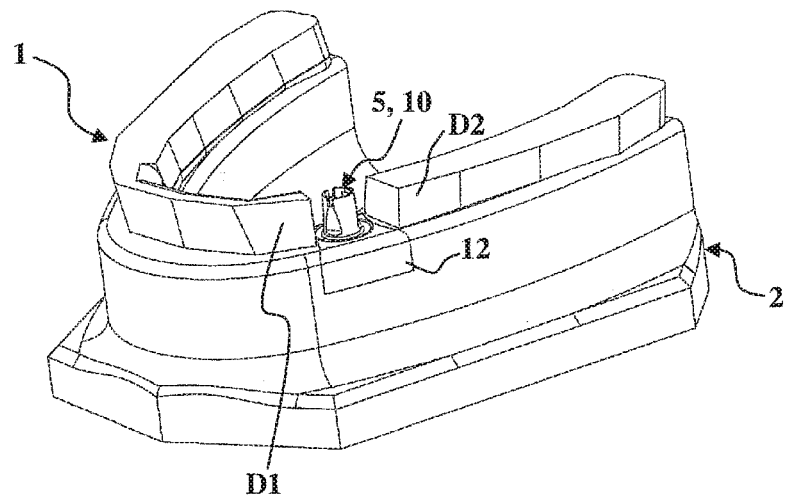
FIG. 14 is a perspective view of the kit from FIG. 10 when assembled.
Figure 15:
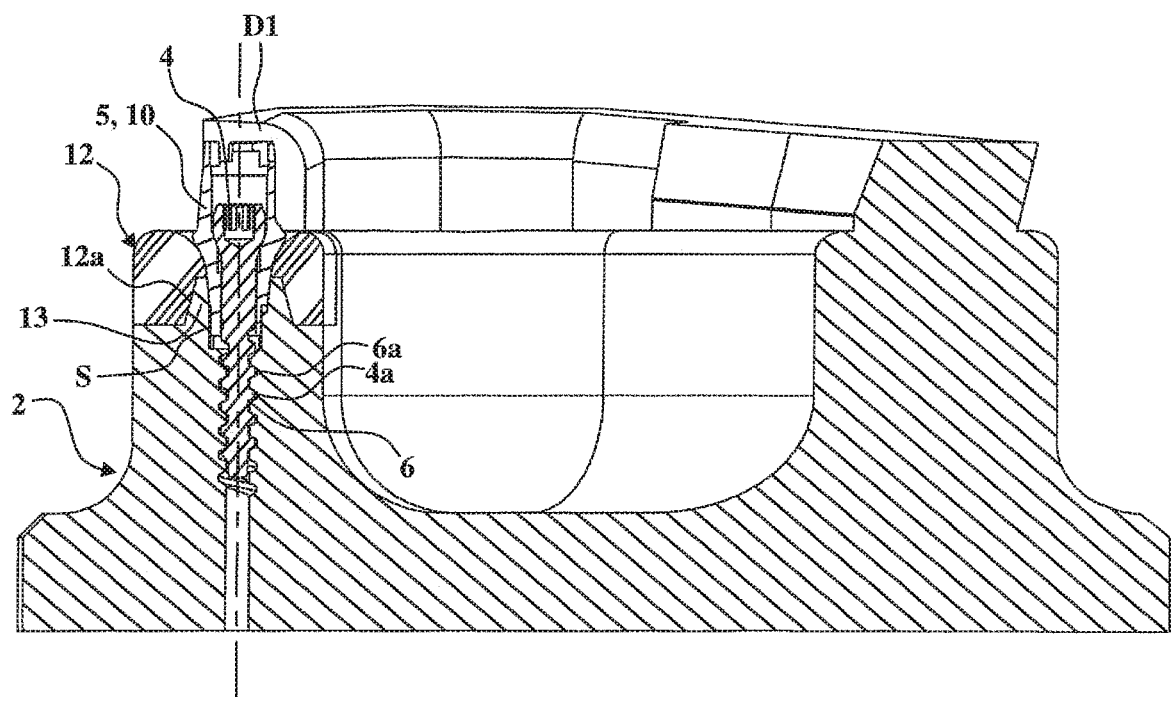
FIG. 15 is a cross-sectional view of the master model from FIG. 14.
Figures 16, 17:
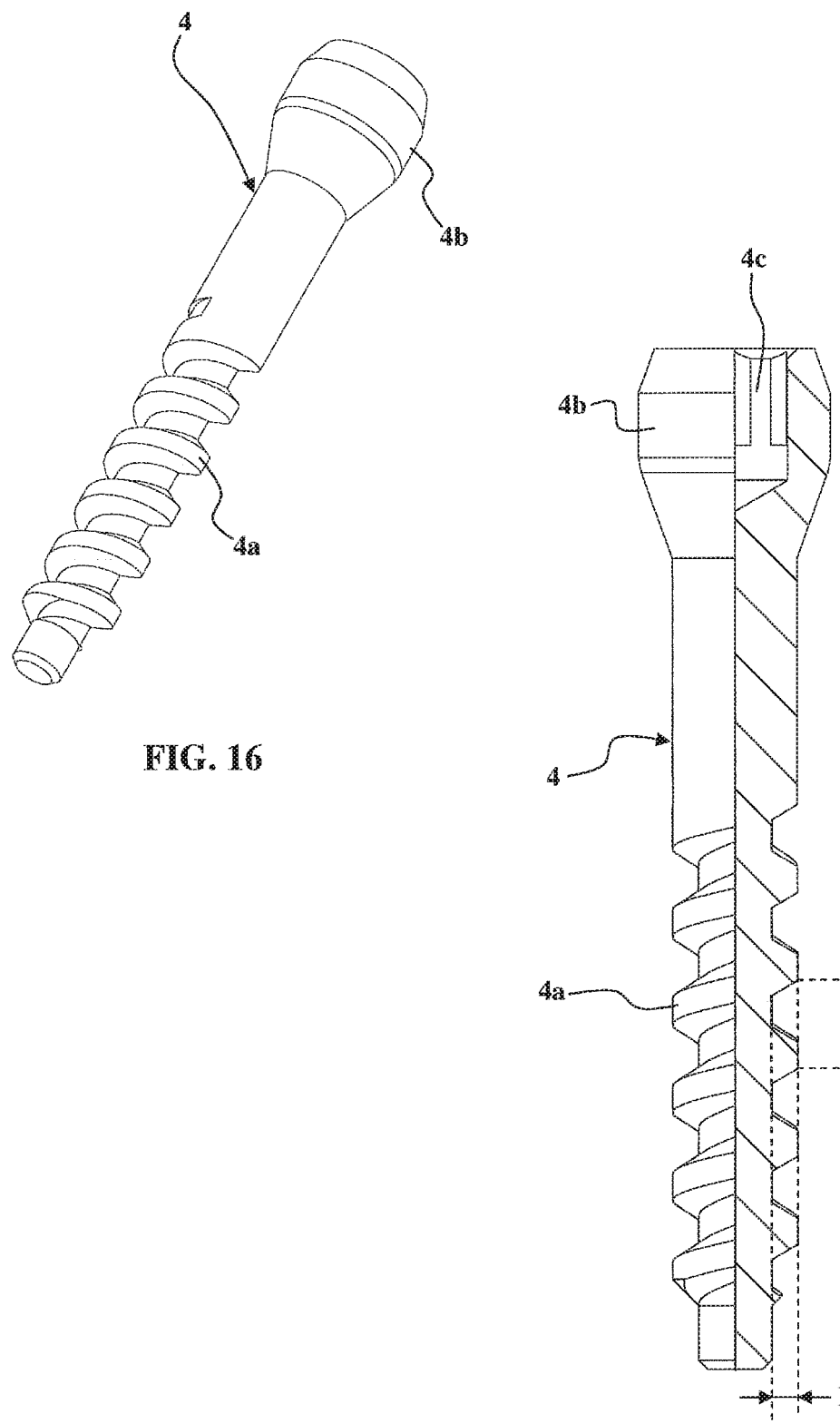
FIG. 16 is a perspective view of the fixing screw of the kit from FIG. 10.
FIG. 17 is a side view of the screw from FIG. 16 in partial cross section.

In the case of the second embodiment, the prosthetist then inserts the abutment 10 into the hollow connection socket 11. The prosthetist then inserts the fixing screw 4 into the threaded cavity 6 and screws it in order to fix the abutment 10 on the master model 2 (FIGS. 14 and 15).

At the end of the screwing, the fixing screws 4 are engaged in the inner thread 6*a* along at least four pitches P.

The prosthetist can then proceed to manufacture, adjust or control the dental prosthesis element (for example a transfixed multiple prosthesis 7 in the case of the first embodiment, or a transfixed single dental prosthesis with abutment 10 in the case of the second embodiment) in the same way as with the "traditional." master models made of plaster.

After the manufacture, adjustment or control of the dental prosthesis element 7 or 10, the latter will be attached and fixed to the dental implant in the mouth of the patient with the aid of another screw (which may be called the definitive fixing screw). Indeed, the profile of the outer thread 4*a* of the fixing screw 4 is different from the profile of the inner thread of the implant in the mouth of the patient, such that this fixing screw 4 cannot then be engaged and/or retained by screwing in the threaded cavity of the implant in the mouth of the patient.

Figure 18:
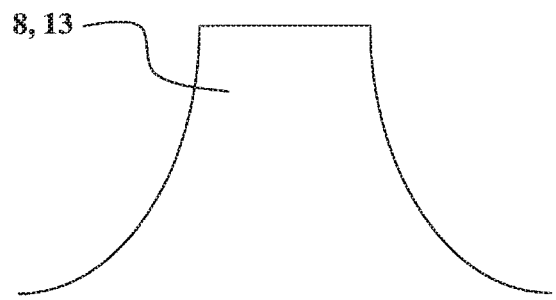
FIGS. 18 to 20 are side views of several examples of an excrescence or a protuberance.
Figure 19:
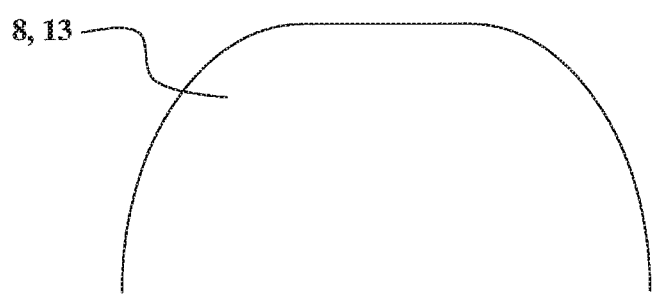
Figure 20:
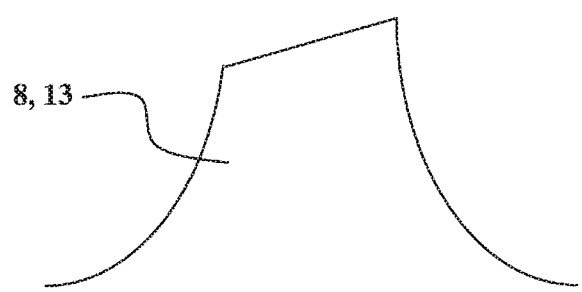

In the embodiments illustrated, in FIGS. 1 to 17, the excrescences 8, the protuberances 13 and the hollow seats 7*a*, 9*a*, 12*a* are frustoconical. However, the excrescences 8 and the protuberances 13 can have different outer shapes, likewise provided with a lateral clearance for a gradual decrease of their cross section, as is illustrated in FIGS. 18 to 20, which are side views of excrescences 8 and protuberances 13. The hollow seats 7*a*, 9*a*, 12*a* can also have inner shapes other than frustoconical ones, for example inner shapes that complement the shapes illustrated in FIGS. 18 to 20.

It is expressly indicated that independent patent protection may be sought for a master model 2 manufactured by means of additive technology such as 3D printing, said master model 2 having at least one reference surface S intended to receive a dental prosthesis element (transfixed multiple prosthesis frame 7, abutment 10 of a single dental prosthesis, etc.) bearing directly thereon, said reference surface S being produced during the manufacture of the master model 2 by additive technology and corresponding to a reference surface of a dental implant arranged in the mouth of the patient. This protection may be sought independently of the presence and of the parameters of the fixing screw 4 and the one or more threaded cavities 6. The problem solved by this combination of features is that of manufacturing a master model by means of an additive technology using an arrangement of material in successive layers, for example 3D printing, at a reduced cost while also reducing the risks of imprecision.

Furthermore, it must be noted that the solution for solving the problem of avoiding a dental surgeon re-using the screw for fixing the prosthesis on the master model in order to fix the prosthesis on the implant in the mouth of the patient (especially since it has already been screwed/unscrewed several times and thus poses a risk of failure in the mouth) does not depend on the relationships mentioned in claim 1, between the parameters of the outer thread 4*a* of the fixing screw 4 and the thickness E of the layers 3. The solution to this specific problem, for which independent patent protection may be sought, is a kit 1 for the preparation of a dental prosthesis, having:

a master model 2 manufactured by means of an additive technology using an arrangement of material in successive layers 3, such as 3D printing, a fixing screw 4 with an outer thread 4*a* intended to removably fix a dental prosthesis element 5, 7, 10 on the master model 2, in which:

the master model 2 has at least one reference surface S intended to receive the dental prosthesis element 5, 7, 10 bearing (directly) thereon, said reference surface S being produced during the manufacture of the master model 2 by additive technology, the master model 2 has at least one threaded cavity 6, of which the inner thread 6*a*, intended to receive said fixing screw 4 by screwing, is produced during the manufacture of the master model 2 by additive technology, the profile of the outer thread 4*a* of the fixing screw 4 is different from the profile of the inner thread of the threaded cavity of the implant in the mouth of the patient, such that the fixing screw 4 cannot be engaged and/or retained by screwing in the threaded cavity of the implant in the mouth of the patient.

The present invention is not limited to the embodiments that have been explicitly described, and instead it includes the different variants and generalizations contained within the scope of the attached claims.

The invention claimed is:

1. A kit (1) for preparing a dental prosthesis, said kit having:

a master model (2) manufactured by means of an additive technology providing said master model (2) with an arrangement of material in successive layers (3), a fixing screw (4) with an outer thread (4a) intended to removably fix a dental prosthesis element (5, 7, 10) on the master model (2), wherein:

the master model (2) has at least one reference surface (S) intended to receive the dental prosthesis element (5, 7, 10) bearing thereon, said reference surface (S) being produced during the manufacture of the master model (2) by additive technology, the master model (2) has at least one threaded cavity (6), of which the inner thread (6a), intended to receive said fixing screw (4) by screwing, is produced during the manufacture of the master model (2) by additive technology, the outer thread (4a) of the fixing screw (4) has:

a pitch (P) greater than or equal to 10 times the thickness (E) of the layers (3), a thread height (H) greater than or equal to 5 times the thickness (E) of the layers (3).

2. The kit (1) as claimed in claim 1, wherein the outer thread (4a) of the fixing screw (4) does not have a metric profile.

3. The kit (1) as claimed in claim 1, wherein the outer thread (4a) of the fixing screw (4) has a trapezoidal profile.

4. The kit (1) as claimed in claim 1, wherein the fixing screw (4) and the at least one threaded cavity (6) are configured such that, when a dental prosthesis element (5, 7, 10) is fixed on the master model (2), the fixing screw (4) is engaged in the inner thread (6a) along at least four pitches (P).

5. The kit (1) as claimed in claim 1, wherein:

the kit (1) is intended to be combined with a dental prosthesis element (5) in the form of a transfixed multiple prosthesis frame (7), the threaded cavity (6) is formed in an excrescence (8) with a distal segment (8a) intended to engage at least partially in a corresponding hollow seat (7a) formed in said transfixed multiple prosthesis frame (7).

6. The kit (1) as claimed in claim 5, wherein:

the distal segment (8a) of the excrescence (8) is provided with a lateral clearance on its outer surface, and/or the hollow seat (7a) is provided with a lateral clearance on its inner surface.

7. The kit (1) as claimed in claim 5, wherein:

it additionally comprises a false gum (9) intended to be attached to the master model (2), one of the master model (2) and the false gum (9) has an excrescence (8) provided with a segment (8b) intended to engage at least partially in a corresponding hollow seat (9a) formed in the other of the master model (2) and the false gum (9).

8. The kit as claimed in claim 7, wherein:

the segment (8b) of the excrescence (8) is provided with a lateral clearance on its outer surface, and/or the hollow seat (9a) is provided with a lateral clearance on its inner surface.

9. The kit (1) as claimed in claim 1, wherein:

the kit (1) is intended to be combined with a dental prosthesis element (5) in the form of a transfixed multiple prosthesis frame (7), the threaded cavity (6) is formed in the continuation of a hollow seat, said hollow seat being intended to receive at least part of the distal segment of a corresponding excrescence carried by said transfixed multiple prosthesis frame (7).

10. The kit (1) as claimed in claim 9, wherein:

the distal segment (8a) of the excrescence (8) is provided with a lateral clearance on its outer surface, and/or the hollow seat (7a) is provided with a lateral clearance on its inner surface.

11. The kit (1) as claimed in claim 9, wherein:

it additionally comprises a false gum (9) intended to be attached to the master model (2), one of the master model (2) and the false gum (9) has an excrescence (8) provided with a segment (8b) intended to engage at least partially in a corresponding hollow seat (9a) formed in the other of the master model (2) and the false gum (9).

12. The kit as claimed in claim 11, wherein:

the segment (8b) of the excrescence (8) is provided with a lateral clearance on its outer surface, and/or the hollow seat (9a) is provided with a lateral clearance on its inner surface.

13. The kit (1) as claimed in claim 1, wherein:

the kit (1) is intended to be combined with a dental prosthesis element (5) in the form of an abutment (10) of a single dental prosthesis, a hollow connection socket (11) intended to receive said abutment (10) of a single dental prosthesis is formed at the mouth of the threaded cavity (6).

14. The kit (1) as claimed in claim 13, wherein the hollow connection socket (11) has a non-circular cross section.

15. The kit (1) as claimed in claim 14, wherein:

it additionally comprises a false gum (12) intended to be attached to the master model (2), one of the master model (2) and the false gum (12) has a protuberance (13) intended to engage at least partially in a corresponding hollow seat (12a) formed in the other of the master model (2) and the false gum (12).

16. The kit (1) as claimed in claim 15, wherein:

the protuberance (13) is provided with a lateral clearance on its outer surface, and/or the hollow seat (12a) is provided with a lateral clearance on its inner surface.

17. The kit (1) as claimed in claim 1, wherein:

the kit (1) is intended to be combined with a dental prosthesis element (5) in the form of an abutment (10) of a single dental prosthesis, the threaded cavity (6) is formed in an excrescence with a distal segment intended to engage at least partially in a corresponding hollow seat formed in said abutment (10) of a single dental prosthesis.

18. The kit (1) as claimed in claim 17, wherein:

it additionally comprises a false gum (12) intended to be attached to the master model (2), one of the master model (2) and the false gum (12) has a protuberance (13) intended to engage at least partially in a corresponding hollow seat (12a) formed in the other of the master model (2) and the false gum (12).

19. The kit (1) as claimed in claim 18, wherein:

the protuberance (13) is provided with a lateral clearance on its outer surface, and/or the hollow seat (12a) is provided with a lateral clearance on its inner surface.

20. The kit (1) as claimed in claim 17, wherein:

the distal segment of the excrescence is provided with a lateral clearance on its outer surface, and/or the hollow seat is provided with a lateral clearance on its inner surface.

21. The kit (1) as claimed in claim 1, wherein the profile of the outer thread (4*a*) of the fixing screw (4) is different from the inner thread profile of the threaded cavity of an implant adapted to be placed in the mouth of a patient, such that this fixing screw (4) cannot then be engaged and/or retained by screwing in the threaded cavity of the implant in the mouth of the patient.

22. The use of a kit (1) as claimed in claim 1 for the manufacture, adjustment or control of a dental prosthesis element (5, 7, 10) by a prosthetist, wherein the prosthetist:
  attaches said dental prosthesis element (5, 7, 10) such that it bears directly on the reference surface (S) of the master model (2),
  fixes said dental prosthesis element (5, 7, 10) to the master model (2) by screwing the fixing screw (4) into the threaded cavity (6) of the master model (2).

23. The kit (1) as claimed in claim 1, wherein the master model (2) is manufactured by 3D printing.

\* \* \* \* \*